US005848655A

United States Patent [19]

Cooper et al.

[11] Patent Number: 5,848,655

[45] Date of Patent: Dec. 15, 1998

[54] OSCILLATING MASS-BASED TOOL WITH DUAL STIFFNESS SPRING

[75] Inventors: Timothy R. Cooper, Owega, N.Y.; Thomas P. Low, Belmont, Calif.; Ronald E. Pelrine, Silverthorne, Colo.; Dale W. Ploeger, Menlo Park, Calif.

[73] Assignee: Ingersoll-Rand Company, Woodcliff Lake, N.J.

[21] Appl. No.: 865,043

[22] Filed: May 29, 1997

[51] Int. Cl.[6] .......................... B25B 14/00; B23Q 17/09

[52] U.S. Cl. .......................... 173/176; 173/5; 173/93; 173/93.5; 173/20; 173/117; 173/217; 173/181; 173/183

[58] Field of Search .......................... 173/176, 171, 173/178, 181, 182, 183, 5, 49, 93, 93.5, 93.6, 104, 210, 6, 20, 117, 217; 81/469, 470

[56] References Cited

U.S. PATENT DOCUMENTS

| | | | |
|---|---|---|---|
| 4,019,589 | 4/1977 | Wallace | 173/178 |
| 4,124,026 | 11/1978 | Berner et al. | 173/213 |
| 4,524,651 | 6/1985 | Dubiel et al. | 173/171 |
| 4,887,499 | 12/1989 | Kipfelsberger | 173/177 |
| 5,094,301 | 3/1992 | Wipperman et al. | 173/5 |
| 5,285,857 | 2/1994 | Shimada | 173/181 |
| 5,457,866 | 10/1995 | Noda | 173/183 |
| 5,492,185 | 2/1996 | Schoeps et al. | 173/183 |
| 5,637,968 | 6/1997 | Kainec et al. | 81/469 |

*Primary Examiner*—Scott A. Smith
*Attorney, Agent, or Firm*—Walter C. Vliet

[57] ABSTRACT

Disclosed is a low reaction oscillating mass-based torquing tool wherein an oscillating mass is excited into near resonant oscillation by reversing pulses resulting in increased energy stored in oscillation about a dual stiffness spring which develops a higher torque output with the stiffer spring action in the tightening direction and hence tightens the fastener.

6 Claims, 4 Drawing Sheets

OSCILLATING MASS-BASED TOOL WITH DUAL STIFFNESS SPRING

BACKGROUND OF THE INVENTION

This invention relates generally to power tools and more particularly to inertia based handheld torquing tools. Currently, low reaction tools are typically devices that accelerate a rotary inertia mass through a relatively large travel angle. This acceleration is developed using a motor with a torque output that is relatively low compared to the output torque capability of the tool. As the inertia mass accelerates, it stores kinetic energy. After the inertia mass has traveled through a significant angle (for example, 180 degrees or more), a clutching means engages the rotary inertia mass to a workpiece. The subsequent negative acceleration of the inertia mass results in a torque output that is relatively high compared to that supplied by the accelerating motor. This high torque output is not reacted on the user, as the reaction is provided by the torque associated with the negative acceleration of the flywheel or inertia mass.

Typically, two types of clutching means are provided between the inertia mass and the workpiece. The dominant method is to utilize a mechanical clutch. Rapid engagement and disengagement of the clutch unfortunately results in the production of noise and the high stresses developed in the impact conversion zone of the clutch results in wear and deformation of parts which reduce efficiency and limit the clutch life.

A second clutching method uses a hydraulic lockup clutch. Although quieter in operation than existing mechanical clutches, the expense in manufacture and the potential for loss of hydraulic fluids limits their application.

In order to tighten a threaded fastener, one must rotate a bolt via applying a torque to clamp a joint. All bolts have some lead and helix angle that permits the clockwise rotation, for right hand fasteners, to translate a nut or member to cause tension in the bolt. These angles make the bolt more difficult to turn (e.g., higher torque) when clamping a joint versus the reverse direction, which is loosening a joint. When we consider an oscillatory drive system, applying equal forward and reverse torque to the fastener will cause the joint to loosen for the reasons discussed above. One method to overcome this obstacle would be to apply a bias torque on the drive motor so that the tightening torque would be greater than the loosening torque. This option would create a bias torque on the housing which would have to be reacted by the operator. For a low torque range tool, where the bias would be small, this may be appropriate.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

The concept presented here, is to create a dual stiffness spring which has a greater resistance to torsion (e.g., greater stiffness) in the tightening direction and a smaller resistance to torsion (e.g., softer stiffness) in the loosening direction. This eliminates the need for a bias torque and thus, the reaction torque applied to the housing is relatively small.

The embodiment disclosed herein is one which exploits the relative difference between bending and torsional stiffness in beams. The attached figures depict a mode of operation that is bending in the loosening direction and bending plus torsion in the tightening direction.

In one aspect of the present invention this is accomplished by providing a resonant oscillating mass-based torquing tool including a rotatable resonant oscillating mass; a means for effecting oscillation of the mass; a dual stiffness spring connecting the oscillating mass to a rotating friction set workpiece; and the dual stiffness spring effects a higher torsional output to the workpiece in one tightening rotational direction to rotate the workpiece in a tightening direction; and a lower torsional output in an opposite rotational direction being insufficient to effect rotation of the workpiece in the opposite rotational direction.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
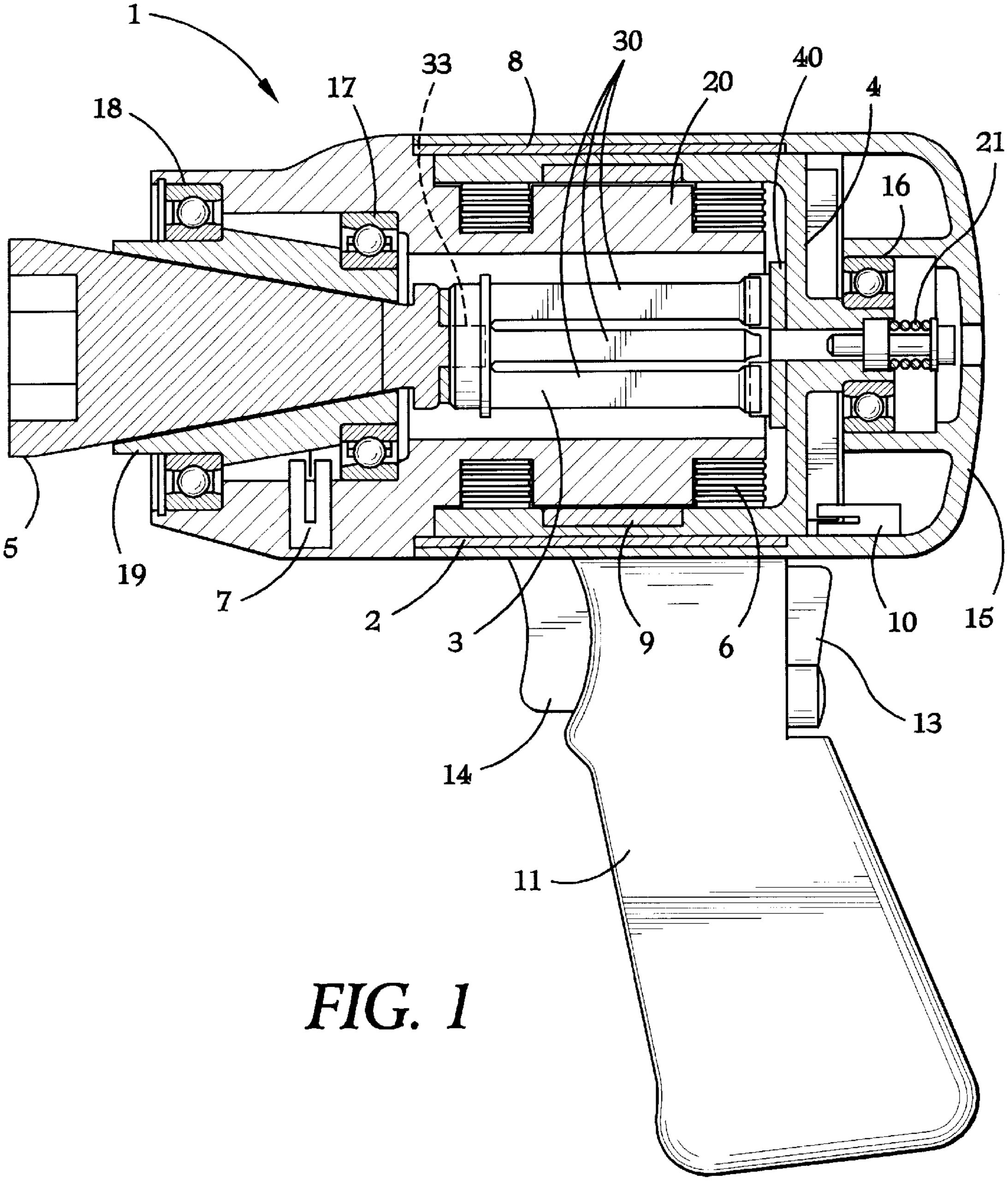
FIG. 1 is a cross sectional view of a resonant oscillating mass-based torquing tool according to the present invention.

Referring to FIG. 1, a resonant oscillating mass-based dual stiffness spring torquing tool according to the present invention is shown and generally designated by the reference numeral 1. A collet type socket or clamping means 5 engages tightly to the head of a fastener to be tightened (not shown). The collet type socket 5 is attached to a dual stiffness axial torsion spring 3 which in turn is attached to a cup shaped flywheel rotor or oscillating mass 4 through a spring finger receiving socket or drive hub 40. The flywheel rotor 4 oscillates and rotates about an internal stator in a manner which will be later described. A shield ring and magnetic return path 8 surrounds the flywheel rotor 4 and is made of a magnetic conductive material such as steel. The shield ring 8 is in turn encased in a casing 15 which forms the outside shell of the tool. A handle 11 is provided attached to the casing 15 for purpose of holding the tool. Trigger 14 activates the tool and a forward and reverse switch 13 selects the direction of rotation in either a tightening (normally clockwise) direction or an untightening direction (normally counterclockwise) as viewed by the operator.

As shown in FIG. 1, the flywheel rotor 4, dual stiffness bending torsion spring 3, and collet 5 are journalled for rotation within the housing 15 by means of bearing 16 and within an extension of the stator 20 by means of bearings 17 and 18 which surround the collet 19. A forward optical encoder 7 is provided to monitor the rotation of the collet and optical flywheel positioning encoder 10 is provided for determining the motion and position of the flywheel rotor 4.

Figure 4:
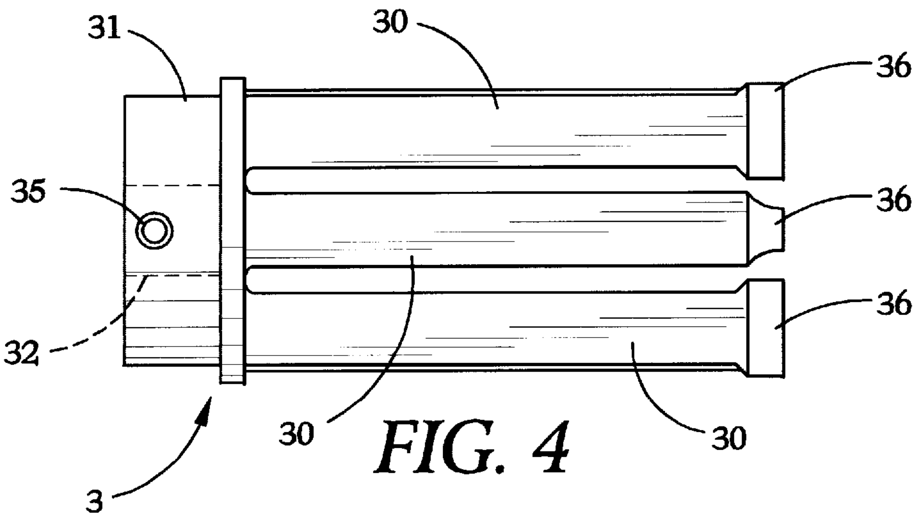
FIG. 4 is an enlargement of the axial dual stiffness spring of the preferred embodiment of the present invention.
Figure 5:
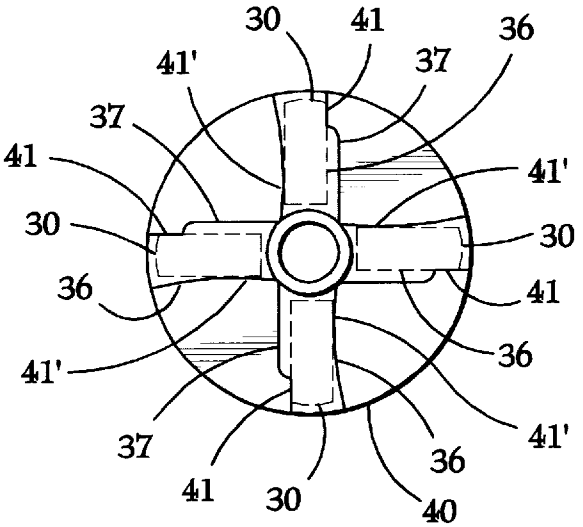
FIG. 5 is an end view of the dual spring receiving socket in the oscillating mass showing in dotted line the assembled neutral position of the spring tips.

Referring to FIGS. 1, 4, and 5, one embodiment of a dual stiffness spring is shown and identified by the reference numeral 3. The spring is comprised of four axially extending fingers 30 connected to and extending from a base 31. A bore 32 is provided to accept a collet drive shaft 33 which in turn is drivingly connected to the base 31 by means of a drive pin 35. The tips 36 of the axial spring fingers 30 are accurately formed to cooperate with an accurately formed slot 37 in a drive hub 40, best seen in FIGS. 1 and 5. The drive hub 40 is in turn connected to the flywheel rotor 4 and is driven in oscillation thereby. The configuration of the slot 37 is such that when the hub 40 is driven in the clockwise rotation, as shown in FIG. 5 (counterclockwise untightening rotation as viewed by the operator), the spring finger 30 is deformed primarily in bending. In the counterclockwise direction of rotation, the hub 40 applies a force through contact point 41 and 41' which tends to both bend and twist the spring fingers 30 thereby showing increased resistance to rotation in the counterclockwise direction of rotation shown in FIG. 5 (clockwise or tightening direction when viewed from the operator position). The dual stiffness spring therefore exhibits different spring stiffness in the tightening (stiffer) direction than in the reverse (untightening softer direction).

Figure 6:
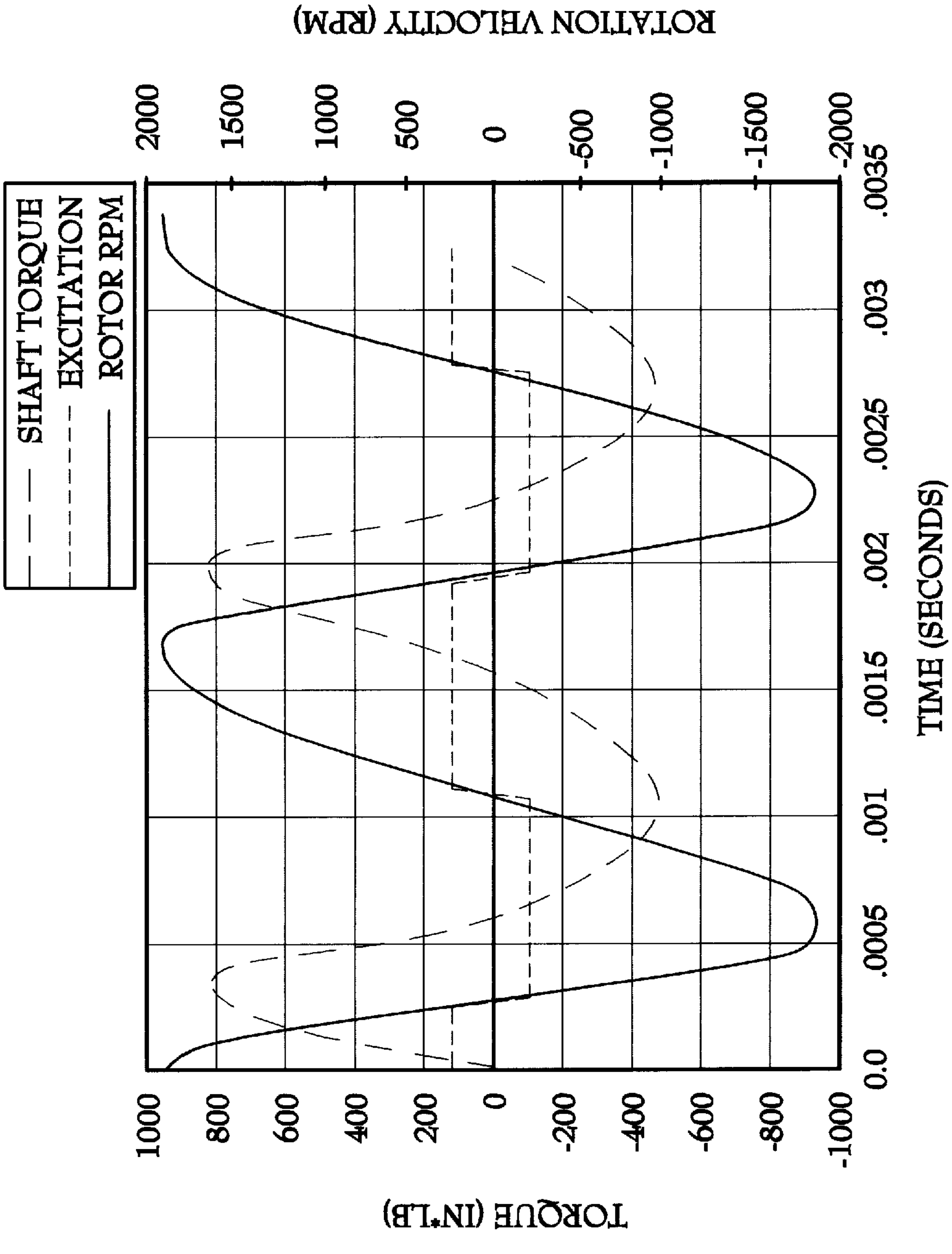
FIG. 6 is a plot of the torque versus time relationships for the shaft torque and excitation torque with an overlay of the rotor RPM value at each position.

The above effect is best seen in the diagram shown in FIG. 6 wherein the plot of the flywheel rotor 4 RPM is shown as compared to the square wave excitation torque of the flywheel and the exhibited output shaft torque values achieved. As can be seen in FIG. 6, for a given excitation torque a considerably higher shaft tightening torque (approaching 800 in.lbs.) may be developed compared to the minus 400 in.lbs. achieved in the reverse or untightening portion of the cycle.

Figure 3:
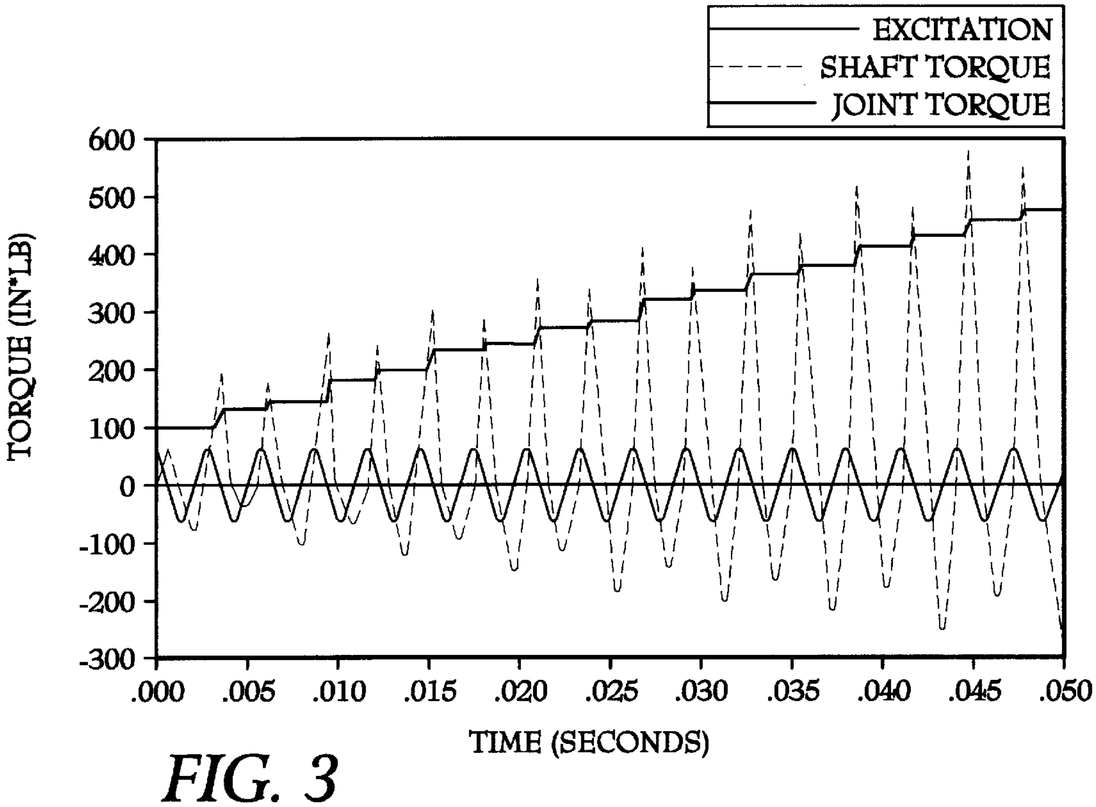
FIG. 3 is a graph showing the applied torque on a fastener over time for a resonant oscillator mass-based system tool according to the present invention.

In operation, when tightening a threaded fastener, the flywheel is driven initially as a conventional motor by means of excitation of electromagnetic coils and reaction against permanent magnets 9 to perform the rundown portion of a fastening cycle. Once the fastener reaches the output limit of the flywheel being driven as a conventional motor, the rotation of the collet type socket 5 ceases as sensed by the forward optical encoder 7. The position of the flywheel rotor 4 is sensed by the optical positioning encoder 10. As depicted in FIG. 3, upon sensing the condition of a stalled collet, the appropriate electrical circuitry begins to oscillate the flywheel by applying reversing energy pulses to the electromagnetic coils 9 causing the flywheel to oscillate at or near the resonant frequency of the inertia mass spring system.

Using the oscillating mass principal of the present invention it is therefore possible to achieve output torques many times the motor applied excitation torque. Another way of stating this is that when the torque in the torsion spring exceeds the workpiece torque resisting fastener motion, the fastener would be accelerated by the difference between the torques. In this process some energy would be removed from the oscillating mass system. The motor would replace this energy and add more with repeated oscillation allowing the oscillation to continue to build up. When the desired fastener torque is reached the motor stops exciting the flywheel.

The optical encoders 7 and 10 provide feedback for control of the tool. In typical tool operation, it might be desirable to operate the flywheel as a motor to initially run down the fastener to a snug torque. Snug torque may be sensed by the stalling of the collet rotation. At this point a signal is sent to begin the oscillating pulse mode of the motor wherein the flywheel is caused to oscillate at or near resonant frequency of the mass spring system by repeated applications of reversing torque pulses. The dual stiffness spring results in a higher peak torque being applied in the one tightening direction and a lower untightening torque being applied over a longer duration in the reverse direction. The difference in applied torque is chosen by the relative stiffness of the spring which prevents untightening of the fastener in the reverse torque application. The higher applied torque in the forward or tightening direction overcomes fastener friction and progresses the fastener in the tightening direction.

In addition to the embodiment discussed above, numerous other embodiments are possible. The common thread in all embodiments would be that the energy to be used for torquing the workpiece is developed by oscillating a mass spring system at or near its resonant frequency including a dual stiffness spring as a means for biasing output torque.

Figure 2:
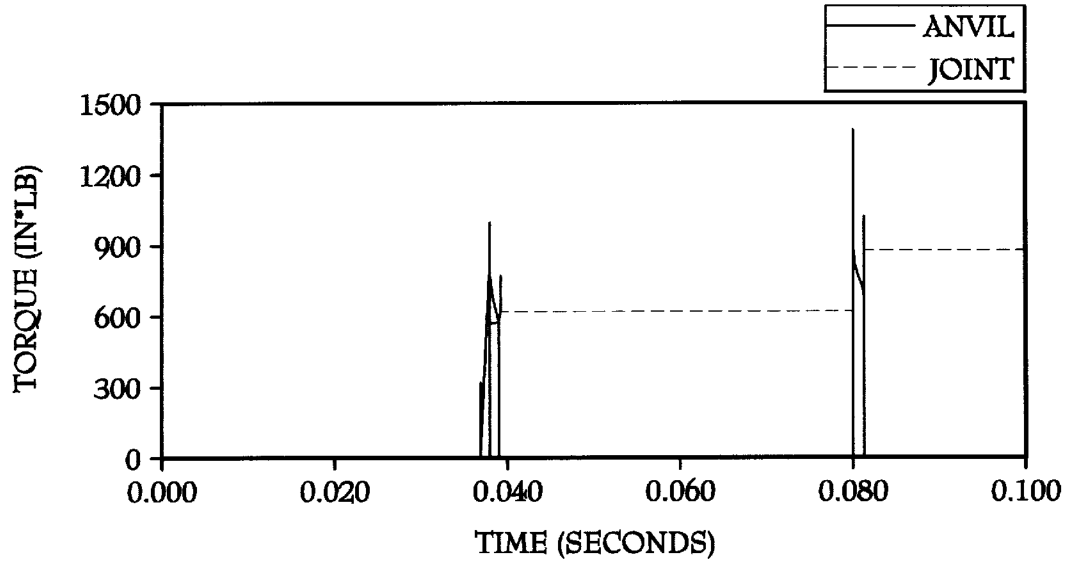
FIG. 2 (PRIOR ART)
FIG. 2 is a graph showing the application of torque on a fastener over time for an accelerated mass-based impact tool according to the prior art.

The present invention exhibits low reaction and low vibration. The excitation frequencies may be generally high relative to the torque delivery frequency of the current tools. These higher frequencies are more easily attenuated than the frequencies associated with the repeated "flywheel spinup" of current impact tools (see FIG. 2). In oscillating mass-based approaches that utilize narrow band excitation frequencies, sound and vibration reduction strategies are easier to implement, as compared to implementation in the face of the broadband behavior of current impact tools. In addition, impact surfaces may be eliminated resulting in less noise and wear.

The tools according to the present invention are easier to control and exhibit greater torquing accuracy. The tool of the present embodiment delivers torque to the workpiece in smaller, more frequent torque pulses. The smaller pulses allow a finer control over the applied torque and is less dependent on workpiece stiffness, i.e., joint rate than current low reaction tools. In addition, the present concept lends itself well to electronically driven embodiments which provide increased user control in other ways, for example operating speed.

Having described our invention in terms of a preferred embodiment, we do not wish to be limited in the scope of our invention except as claimed.

What is claimed is:

1. A resonant oscillating mass-based torquing tool comprising:

a rotatable resonant oscillating mass;

a means for effecting oscillation of said mass;

a dual stiffness spring connecting said oscillating mass to a rotating friction set workpiece; and said dual stiffness spring effects a higher torsional output to said workpiece in one tightening rotational direction to rotate said workpiece in a tightening direction; and a lower torsional output in an opposite rotational direction being insufficient to effect rotation of said workpiece in said opposite rotational direction.

2. An oscillating mass-based torquing tool according to claim 1 wherein:

said torquing tool comprises a handheld torque wrench.

3. A resonant oscillating mass-based torquing tool according to claim 1 wherein:

said dual stiffness spring comprises a combination bending and torsion spring.

4. A resonant oscillating mass-based torquing tool according to claim 1 wherein:

said dual stiffness spring permits relative rotation between said rotatable resonant oscillating mass and said friction set workpiece.

5. A resonant oscillating mass-based torquing tool according to claim 1 wherein:

a position of said oscillating mass is determined by a position encoder.

6. A resonant oscillating mass-based torquing tool according to claim 5 wherein:

said position encoder comprises an optical position encoder.

* * * * *